United States Patent [19]

Erb

[11] 3,924,010

[45] Dec. 2, 1975

[54] METHOD FOR RIPENING FRUIT IN ATMOSPHERE OF ETHYLENE AND CARBON DIOXIDE

[75] Inventor: Ezra Erb, Edison, N.J.

[73] Assignee: Union Carbide Corporation, New York, N.Y.

[22] Filed: July 27, 1973

[21] Appl. No.: 383,063

[52] U.S. Cl. ............... 426/312; 426/263; 426/270; 426/418
[51] Int. Cl.² ............................................ A23L 1/20
[58] Field of Search .......... 426/263, 312, 316, 320, 426/418, 270

[56] References Cited
UNITED STATES PATENTS

| | | | |
|---|---|---|---|
| 1,716,791 | 6/1929 | Ness | 219/370 |
| 2,541,441 | 2/1951 | Sharp et al. | 426/418 |
| 3,620,765 | 11/1971 | McDonnell | 426/263 |
| 3,798,333 | 3/1974 | Cummin et al. | 426/316 |

*Primary Examiner*—Norman Yudkoff
*Assistant Examiner*—Curtis P. Ribando
*Attorney, Agent, or Firm*—Bernard Lieberman

[57] ABSTRACT

A non-flammable composition useful for ripening fruit consisting of a liquid solution of ethylene and carbon dioxide, containing from about 1 to 6.3 wt.-% ethylene and from about 93.7 to 99 wt.-% $CO_2$. The process comprises contacting the fruit to be ripened with a gaseous mixture produced by vaporization of the ethylene-$CO_2$ solution.

2 Claims, No Drawings

METHOD FOR RIPENING FRUIT IN ATMOSPHERE OF ETHYLENE AND CARBON DIOXIDE

BACKGROUND

This invention relates, in general, to a composition and process for degreening fruit. More particularly, the invention relates to a non-flammable, non-explosive ethylene-$CO_2$ composition, and a process for accelerating the ripening of fruit wherein such composition is useful.

A large variety of fruits and vegetables are characterized by relatively short shelf lives in the ripened condition. Bananas, for example, customarily become overripe and turn brown, at room temperature, within a period of 1–4 days after they have fully ripened. Consequently, economic considerations dictate that bananas be picked and shipped while they are still unripe and green in color. In addition to preventing spoilage, the shipment of bananas when they are green insures that they arrive at their destination in better condition due to the fact that they more readily endure conditions of handling and shipping in the unripe state.

It was customary, in the past, to ripen the stalks of green bananas received from the grower in warehouses where they were left to stand for a period of time and then delivered to retail stores to be displayed for sale. The major disadvantage of this procedure was the relatively long storage time required for ripening as well as the unpredictable ripening schedule which varied depending upon the particular batch of bananas and the environmental conditions in the warehouse. In response thereto, fruit dealers began to treat bananas with gases such as ethylene and propylene which accelerate the biochemical process of ripening without adversely affecting the flavor, texture, nutritional value or appearance of the fruit.

Accordingly, in conventional practice, the green unripened fruit is normally placed in a warm sealed enclosure wherein ethylene is introduced in sufficient quantities so as to continuously contact the green fruit with an atmosphere containing a minimum of about 2.5 ppm of ethylene, the critical concentration necessary to initiate the biochemical ripening reaction. Unfortunately, however, ripening fruit in this manner has resulted in numerous injuries to operating personnel and damage to warehouses because of the flammable and explosive nature of ethylene. For example, notwithstanding the fact that the ethylene gas may be discharged into the enclosure in amounts calculated to avoid producing an explosive mixture with air, an explosive mixture may, nevertheless, result due to localized pockets of gas which do not mix homogenously with the air in the chamber. Thus, an explosion hazard may be created unexpectedly due to non-equilibrium conditions of mixing either within the ripening enclosure or in the vicinity of the discharging pressurized cylinder of ethylene.

In an effort to eliminate the danger of explosion, attempts have been made to ripen fruit with a non-flammable gas mixture. U.S. Pat. No. 3,620,765 to McDonnel et al., for example, discloses a method of ripening bananas using a 6 volume % ethylene-94% nitrogen gas mixture which is nonexplosive. While such a gas mixture may be satisfactory from the standpoint of safety; nevertheless, in commercial practice it is uneconomical because of the relatively large volumes of gaseous mixture which are required during the ripening operation. That is, since the percentage of ethylene in the disclosed mixture is only 6%, the remainder being inert gas, large volumes of gas must be continually flushed through the ripening chamber in order to insure that the fruit is in constant contact with the desired atmosphere. This necessarily requires frequent replacement of the depleted gas cylinders and the concomittant task of shipping, storing and handling an inordinate number of heavy gas storage cylinders.

OBJECTS

Accordingly, it is an object of this invention to provide a non-explosive fruit-ripening composition containing a relatively large concentration of ethylene.

It is another object of this invention to provide a relatively economical fruit-ripening composition which is liquefiable at room temperature.

It is still another object of the invention to provide a process for ripening bananas characterized by the use of a non-flammable liquefiable fruit-ripening composition containing a relatively large concentration of ethylene.

SUMMARY OF THE INVENTION

The above objects and others which will be apparent to those skilled in the art are achieved by the present invention, one aspect of which comprises: a non-flammable composition comprising a liquid solution of ethylene and carbon dioxide containing from about 1 to 6.3 wt.-% ethylene and from about 93.7 to about 99 wt.-% carbon dioxide.

The second aspect of the present invention is a process for ripening fruit comprising the steps of:

1. placing the fruit to be ripened into an enclosed chamber,
2. introducing into said chamber a gas phase mixture containing from about 1 to 7.3 wt.-% ethylene, and from about 92.7 to 99 wt.-% carbon dioxide, at a flow rate sufficient to maintain a concentration of at least 2.5 ppm of ethylene in the atmosphere within said chamber, and
3. maintaining said fruit in said chamber for a period of time sufficient to achieve the desired degree of ripening.

The term "fruit" as used herein is intended to encompass bananas, tomatoes, pears, melons and other fruit which may be ripened by the process of the invention.

The fruit-ripening compositions of the present invention are characterized by the fact that they are non-flammable compositions which are liquefiable at room temperature, i.e. about 70°F. This is of primary importance because in contrast with a non-flammable ethylene-$N_2$ mixture, the compositions of the present invention contain a significantly greater mole fraction of ethylene per total moles of mixture. This is attributable, in part, to the fact that $CO_2$ suppresses the flammability of ethylene to a greater extent than nitrogen. Thus, over a wide range of temperature, including the operating temperatures of interest, nearly twice the amount of ethylene may be safely mixed with $CO_2$, as compared to $N_2$, without creating a flammable or an explosive mixture. More important, the compressibility factor of $CO_2$ at ambient temperatures is markedly smaller than the corresponding value for $N_2$ which behaves essentially as an ideal gas. Hence a greater molar amount of $CO_2$ may be compressed into a fixed volume container without exceeding a predetermined operating pressure.

Consequently, a pressurized gas cylinder containing a non-explosive ethylene-$CO_2$ mixture may contain as much as 5 times the weight of ethylene as a correspondingly sized cylinder containing ethylene-$N_2$ at the same pressure.

More specifically, taking as a basis of comparison two gas cylinders of equal volume having the same working pressure, one cylinder containing a mixture of 6.3 wt.-% ethylene, balance $CO_2$, the other containing a gaseous mixture of 5% by volume ethylene, balance $N_2$, the amount of ethylene contained in the ethylene-$CO_2$ cylinder is 4.9 times the weight of ethylene in the ethylene-nitrogen mixture. Therefore, in practical terms, one of the prime benefits of operating with compositions of the present invention is the relative safety and simplicity of the overall ripening operation insofar as maintenance and supervisory personnel are concerned because cylinders have to be changed only one-fifth as frequently as when $N_2$ is the diluent. The smaller number of cylinders required is, of course, a very important economic advantage since the cost of shipment of a gas cylinder is frequently greater than the cost of the gas therein.

The maximum weight ratio of ethylene in the liquid solution is governed by the flammability limits of ethylene-$CO_2$ vapor phase compositions. That is, since the vapor phase of a two component mixture in equilibrium with liquid is richer in the more volatile component, namely ethylene, the upper limit of ethylene dissolved in liquid $CO_2$ is chosen such that the solution will always be in equilibrium with a non-explosive vapor mixture. Accordingly, over a temperature range of from about 0° to 89.2°F, a liquid solution containing no more than 6.3 wt.-% ethylene, balance $CO_2$, will be in equilibrium with a vapor mixture containing no more than 7.3 wt.-% ethylene, the upper limit of safety in the vapor phase. It will, of course, be appreciated that as the liquid in the cylinder is progressively vaporized and discharged into the ripening chamber, the concentration of ethylene in the cylinder as well as in the vapor will progressively decrease, thereby insuring that an explosive gas mixture is never discharged from the cylinder. Thus, for a liquid composition containing 6.3 wt.-% ethylene, the composition of ethylene in the vapor phase will vary from an initial concentration of about 7.3 wt.-% to a final concentration of 4.6 wt.-% at the point where the cylinder is depleted. The lower limit of the ethylene in the liquid solution (i.e. about 1.0 wt.-% ethylene) constitutes the lowest effective concentration which will achieve the advantages of the ethylene-$CO_2$ composition.

DETAILED DESCRIPTION OF THE INVENTION

The fruit to be ripened, such as, for example, green bananas, are ordinarily ripened by storage in an enclosed room having a volume typically of 500–18,000 ft³. The room is maintained at a temperature of from about 58° to 70°F. After the green bananas have been placed into the room and the door to the room has been suitably closed and sealed, a vapor-phase mixture of ethylene and $CO_2$ is introduced into the room through fittings in the wall connected to a storage cylinder containing an ethylene-$CO_2$ composition of the present invention. The location of the pressurized storage cylinder is generally outside of the ripening room.

To initiate ripening, the ethylene-$CO_2$ vapor mixture is introduced into the ripening room in quantities sufficient to maintain a concentration of between 2.5 and 3,000 ppm of ethylene in the atmosphere; the preferred concentration being about 300 ppm of ethylene. Although the vapor mixture may be introduced into the ripening room on an intermittent basis, it is generally preferred, for ease of operation, that the gas flow be continuous. After a period of from about 8 to 24 hours the room is ventilated and the bananas are then held in the ripening room for an additional period of time of from about 2–7 days depending upon the controlled temperature in the ripening room; the higher the temperature, the shorter the ripening period required. The choice of ripening time and temperature are well known variables to those skilled in the art and are discussed in detail in "Banana Ripening Manual" published by United Fruit Sales Corporation, Boston, Massachusetts.

While the ripening gas produced from the vaporization of a liquid solution containing 6.3 wt.-% ethylene is the preferred composition for contacting the unripened fruit in accordance with the process of the invention, it will, nevertheless, be apparent to those skilled in the art that a uniform vapor-phase mixture containing no more than 7.3 wt.-% ethylene may, alternatively, be produced by mixing gaseous $CO_2$ and ethylene in the desired ratio and thereafter maintaining said mixture above the critical temperature of $CO_2$. This is clearly not the preferred option since it creates numerous explosion hazards and, in general, nullifies the advantages associated with the liquid solution.

EXAMPLE I 800 boxes, each containing 40 lbs. of bananas, were introduced into a 6,000 ft³ ripening room. A vaporized gas mixture produced from a liquid solution of 6.3 wt.-% ethylene, balance $CO_2$ was continuously introduced into the ripening room for a period of 24 hours at a flow rate of 0.6 ft³/hr. The doors to the room were then opened and the room ventilated for one-half hour. The bananas were then held in the ripening room for three additional days while controlling the ripening room temperature at 60°–62°F. At the end of the 3 day period the bananas were at the optimum degree of ripeness and were more uniform in color than those ripened in a similar manner using comparable quantities of pure ethylene in the conventional 1-shot dosage form.

EXAMPLE II

A large ripening room (8,976 ft³) was loaded with two carloads of tomatoes graded Green Mature. One carload contained 5 × 6 size tomatoes, the other, 6 × 6 size. The ripening room doors were closed and a vaporized gas mixture from an ethylene-$CO_2$ solution containing 6.3 wt.-% ethylene was introduced into the room over a four day period as follows: 20 lbs. of gas mixture on each of the first 2 days and 10 lbs. on each of the following 2 days. The tomatoes were then stored for an additional 24 hours while maintaining the ripening room temperature at 55°F. The tomatoes were then graded and the results were found to be comparable to those achieved with conventional ripening procedures using pure ethylene in amounts up to 10 times the total quantity of ethylene in the discharged ethylene-$CO_2$ mixture of the present Example.

I claim:

1. A process for ripening fruit comprising the steps of:

1. placing the fruit to be ripened into an enclosed chamber,
2. introducing into said chamber a gas mixture containing from about 1 to 7.3 wt.-% ethylene, and from about 92.7 to 99 wt.-% carbon dioxide, at a flow rate sufficient to maintain a concentration of at least 2.5 ppm of ethylene in the atmosphere within said chamber, and
3. maintaining said fruit in said chamber for a period of time sufficient to achieve the desired degree of ripening.

2. The process of claim 1 wherein the gas mixture is obtained by vaporization of a pressurized liquid solution of ethylene and carbon dioxide containing from about 1 to 6.3 wt.-% ethylene and 93.7 to 99 wt.-% carbon dioxide.

* * * * *